Feb. 24, 1925.

L. J. PERRENOUD 1,527,603

PISTON RING AND PROCESS FOR FORMING THE SAME

Filed Oct. 13, 1924

INVENTOR.
Louis J. Perrenoud
BY
*Thos. S. Donnelly*
ATTORNEY.

Patented Feb. 24, 1925.

1,527,603

UNITED STATES PATENT OFFICE.

LOUIS J. PERRENOUD, OF ECORSE, MICHIGAN.

PISTON RING AND PROCESS FOR FORMING THE SAME.

Application filed October 13, 1924. Serial No. 743,323.

*To all whom it may concern:*

Be it known that I, LOUIS J. PERRENOUD, a citizen of the United States, residing at Ecorse, in the county of Wayne and State of Michigan, have invented a new and useful Improvement in a Piston Ring and Process for Forming the Same, of which the following is a specification.

My invention relates to a new and useful improvement in a piston ring and the process for forming the same. The object of the invention is the provision of a piston ring which will be highly efficient in use, cheap to manufacture and so constructed as to prevent any scoring of the cylinder with which used, while at the same time sealing the same against any leakage of oil or other lubricant.

In the invention the use of a piston ring is had with which a sealing ring is used which is adapted to overlap the carrying ring at its points of separation and thus make a ring which will be tightly sealing throughout its circumference.

Another feature of the ring is the use of a fibre sealing member positioned within channels formed in the metal carrying ring, the edge of the carrying ring and the fibre sealing member being turned down together from a slightly larger dimension to the diameter desired.

Another feature of the invention is the formation of a piston ring which consists in casting a metal carrying ring having channel forming edges which are slightly above the diameter desired, and pressing into the channels a fibre filler which is used to seal the ring from all possible leaks, and turning down the edges of the ring and the fibre member at the same time, the fibre member being glued into position in the metal carrying member during the turning down process.

Other objects will appear hereinafter.

The invention consists in the combination and arrangement of parts and the process hereinafter described and claimed.

Figure 1:
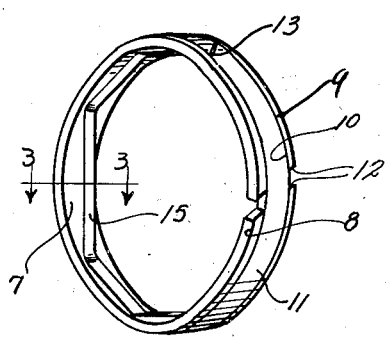
Figure 2:
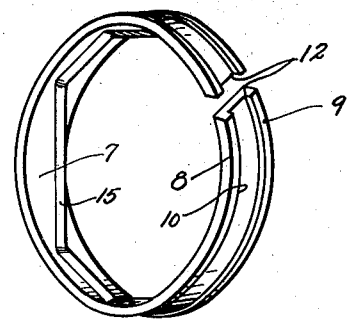
Figure 3:
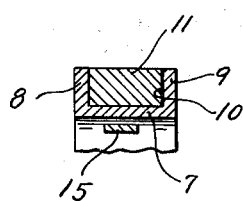
Figure 4:
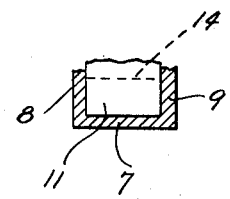

The invention will be best understood from a reference to the accompanying drawings which form a part of this specification and in which, Fig. 1 is a perspective view of the ring with the filler in position, Fig. is a perspective view of the ring with the filler removed, Fig. 3 is a sectional view taken on substantially line 3—3 of Fig. 1, and, Fig. 4 is a view similar to Fig. 3 prior to the turning of the parts to the diameter desired.

The invention, as shown in the drawings, comprises a metallic ring 7 which is made from a very soft cast metal so as to present very little wear to the cylinder with which used. This ring 7 has, on its periphery, at opposite sides thereof, beads 9 and 8 which form the channel 10. A fibre ring 11, diagonally cut at its ends is provided for seating in the channel 10 and overlapping the diagonal cut at 12 of the ring 7. This fibre ring or filler is formed throughout its major portion of such a size that it is pressed tightly into the channel 10 and remains in this channel when in use and cannot be easily removed. The portion of the filler which extends over the break at 12, and from there to the adjacent end is formed so as to seat snugly in the channel 10 but not so as to present a press fit. This snugly seated portion is, when placed in the channel, provided along it edges with a suitable glue. The filler 11 is then pressed, throughout its major length, into the channel 10 the glued portion of the filler seating snugly but easily in the channel.

When assembled in this manner, the ring 7 is not turned to size, the beads 8 and 9 being about .010 of an inch oversize. The fibre is also oversize as shown in Fig. 4. The beads and the fibre are then turned to size, which is indicated in Fig. 4 as along the line 14. The glue along the sides of the filler serve to retain the reduced portion of the filler in fixed relation to the ring 7 during the turning process. After the ring, in this assembled relation, is placed within a cylinder and started in use the glue on the filler will be melted so as to leave the filler fixed in relation to the ring 7 except at that portion on which the glue had been placed. It will be apparent that the ring 7 may now contract or expand, thus closing or opening the gap between the cut ends thereof, the portion of the filler upon which the glue had been placed sliding over the ring 7 in the channel 10. The remaining portion of the filler moves in unison with the ring 7.

On account of forming the ring from a real soft cast metal there will be little resiliency in the ring 7, and a spring 15 is positioned between the piston with which used and the inner surface of the ring 7. The function of this spring is believed to be obvious.

It is thus seen that I have provided a piston ring which is sealed at the overlapping ends and which is so constructed as to give very little wear on the inner surface of the cylinder with which used. It is also apparent that the process of forming the ring consists in casting a carrying ring over size, pressing into a channel in this ring a sealing member, gluing one portion of the sealing member adjacent one end so as to overlap the cut ends of the carrying ring and then turning down the carrying ring and the filler to the dimension desired. This method of structure is one that is economical and progressive in the operations so that there is little possibility of turning out a ring in which all of the steps necessary have not been taken.

While I have illustrated and described the preferred form of structure I do not wish to limit myself to the precise form shown but desire to avail myself of such variations and modification as come within the scope of the appended claims.

Having thus described my invention what I claim as new and desire to secure by Letters Patent is:

1. The process of forming a piston ring which consists in casting a metal ring oversize with a channel in its periphery, pressing a fibre filler into said channel throughout the major portion of said channel and gluing the remaining portion of said filler in said channel and turning down said ring and fibre simultaneously to the desired dimensions.

2. A piston ring comprising a metal ring having a channel formed in its periphery and interrupted in a diagonal cut; and a fibre ring, interrupted, and positioned in said channel in a press fit throughout the major portion of its length, the other portion of said filler being free to move longitudinally in said channel and overlapping the diagonal cut of said metal ring.

3. A piston ring comprising a metal ring interrupted with a diagonal cut; beads mounted on the periphery of said ring and spaced apart to provide a channel; and a filler mounted in said channel, said filler being a press fit in said channel throughout the major portion of its length, and a snug fit throughout the balance of its length, said snugly fitting portion being adapted for slidable movement in said channel.

4. A piston ring comprising a metallic cast ring interrupted with a diagonal cut; beads mounted on the periphery of said ring and spaced apart to provide a channel; and a filler mounted in said channel, said filler being a press fit in said channel throughout the major portion of its length, and reduced in size throughout the balance of its length to provide a snug fit in said channel, said reduced portion being adapted for slidable movement in said channel.

In testimony whereof I have signed the foregoing.

LOUIS J. PERRENOUD.